US012663784B2

(12) United States Patent
Ometto et al.

(10) Patent No.: US 12,663,784 B2
(45) Date of Patent: Jun. 23, 2026

(54) CONTROL METHOD FOR AN INDUSTRIAL PLANT DEFINING POINTS OF INTEREST BY AGGREGATING DATA, CONTROL SIGNALS, AND VIDEO-AUDIO CONTENTS

(71) Applicant: Danieli Automation S.p.A, Buttrio (IT)

(72) Inventors: Marco Ometto, Pasian di Prato (IT); Davide Onesti, Cividale del Friuli (IT)

(73) Assignee: DANIELI AUTOMATION S.P.A., Buttrio (IT)

( * ) Notice: Subject to any disclaimer, the term of this patent is extended or adjusted under 35 U.S.C. 154(b) by 370 days.

(21) Appl. No.: 18/033,839

(22) PCT Filed: Oct. 26, 2021

(86) PCT No.: PCT/IT2021/050352
§ 371 (c)(1),
(2) Date: Apr. 26, 2023

(87) PCT Pub. No.: WO2022/091158
PCT Pub. Date: May 5, 2022

(65) Prior Publication Data
US 2023/0305537 A1      Sep. 28, 2023

(30) Foreign Application Priority Data

Oct. 27, 2020      (IT) ........................ 102020000025360

(51) Int. Cl.
*G05B 19/418*          (2006.01)
(52) U.S. Cl.
CPC . *G05B 19/41865* (2013.01); *G05B 19/41875* (2013.01)

(58) Field of Classification Search
CPC ........ G05B 19/41865; G05B 19/41875; G05B 19/409; G05B 19/41885; G05B 19/4183; G05B 2219/31449; G05B 2219/31455; G05B 2219/31471; G05B 2219/31472; Y02P 90/02
See application file for complete search history.

(56) References Cited

U.S. PATENT DOCUMENTS

| | | | | |
|---|---|---|---|---|
| 5,982,362 A | * | 11/1999 | Crater .................. | G05B 19/042 |
| | | | | 725/38 |
| 7,092,771 B2 | * | 8/2006 | Retlich ........... | G05B 19/41885 |
| | | | | 700/83 |
| 2003/0150909 A1 | * | 8/2003 | Markham .............. | G06Q 10/06 |
| | | | | 235/376 |

(Continued)

FOREIGN PATENT DOCUMENTS

EP          0434050 A2      6/1991

OTHER PUBLICATIONS

International Search Report and Written Opinion issued Feb. 4, 2022 in PCT/IT2021/050352.

*Primary Examiner* — Nicholas Klicos
(74) *Attorney, Agent, or Firm* — Panitch Schwarze Belisario & Nadel LLP

(57) ABSTRACT

Control method for an industrial plant including the acquisition of a plurality of measurement data relating to the components of a plant and/or to a product being worked, their storage in a storage device and simultaneously their transmission to an automation system which uses said measurement data to generate respective control signals.

14 Claims, 2 Drawing Sheets

(56) References Cited

U.S. PATENT DOCUMENTS

| | | | | |
|---|---|---|---|---|
| 2004/0189460 | A1* | 9/2004 | Heaton | G08B 25/009 |
| | | | | 340/500 |
| 2006/0047454 | A1* | 3/2006 | Tamaki | G06Q 10/06 |
| | | | | 702/84 |
| 2007/0282480 | A1 | 12/2007 | Pannese et al. | |
| 2015/0193378 | A1* | 7/2015 | Arnold | H10P 74/23 |
| | | | | 702/179 |
| 2015/0316911 | A1* | 11/2015 | Rischar | G05B 15/02 |
| | | | | 700/9 |
| 2016/0202691 | A1* | 7/2016 | Pettersson | G05B 19/41865 |
| | | | | 700/98 |
| 2017/0351226 | A1 | 12/2017 | Bliss et al. | |
| 2020/0326684 | A1 | 10/2020 | Chand et al. | |
| 2021/0286338 | A1* | 9/2021 | Karako | G05B 19/406 |

* cited by examiner

CONTROL METHOD FOR AN INDUSTRIAL PLANT DEFINING POINTS OF INTEREST BY AGGREGATING DATA, CONTROL SIGNALS, AND VIDEO-AUDIO CONTENTS

CROSS-REFERENCE TO RELATED APPLICATIONS

This application is a Section 371 of International Application No PCT/IT2021/050352, filed Oct. 26, 2021, which was published in the English language on May 5, 2022, under International Publication No. WO 2022/091158 A1, which claims priority under 35 U.S.C. § 119(b) to Italian Application No. 102020000025360, filed Oct. 27, 2020, the disclosures of all of which are incorporated herein by reference.

FIELD OF THE INVENTION

The present invention concerns a control method for an industrial plant. The industrial plant is supervised with a plurality of sensors, which detect the respective measurement data of the plant, and is controlled by an automation system, which receives the measurement data of the sensors and possible operator commands.

By way of example, the industrial plant in question can be a plant in the food industry, or metallurgical, steel, petrochemical, chemical, pharmaceutical, paper, textile industries and suchlike.

BACKGROUND OF THE INVENTION

It is known that very complex industrial plants, such as those of the metallurgical and steel industry, comprise a plurality of apparatuses, equipment, machines and devices controlled by a suitable control apparatus and disposed to define a specific production line for the production of a certain range of products.

Here and hereafter, we will use the generic term "plant components" to include any apparatus, equipment, machine or device that contributes to the creation of a product.

The components of the plant must necessarily interface with each other and be managed effectively so that the product in transit does not suffer damage and is made with the required quality standards, as well as to prevent the latter from damaging the machines it passes through and comply with the expected safety standards.

For this purpose, the control apparatus comprises a plurality of sensor devices, which acquire the measurement data of the plant, and an automation system that processes the measurement data in order to generate control signals to be transmitted to the controlled elements of the plant.

The control apparatus also comprises a man-machine interface which allows an operator to view the measurement data and/or the processed data of the automation system, and to insert operator control commands to be transmitted to the automation system which it can use to establish the control signals as above.

In addition to the plant measurement data collected by the sensors, there is a whole series of weak signals that cannot be directly measured with known sensor systems, or are only perceptible by humans. Often, these weak signals can announce the occurrence of problems, breakdowns, malfunctions or simply can reveal incorrect choices of the processing parameters.

These weak signals are subjected to the interpretation of the operator, and it sometimes happens that their detection and the quality thereof depends for example, but not only, on the degree of experience of the operator designated to control the process. It may happen that, if the process is supervised by an inexperienced operator, despite the high level of automation of the plant, the perception of what is happening can lead to an incorrect interpretation of the event and therefore to a non-optimal sequence of behaviors and operations.

One disadvantage of known control methods is that it is not possible to organically process the information relating to these weak signals perceived by the operator with the measurement signals acquired by the sensors. This severely limits the ability of the automation system to manage unexpected events in the best possible way, and possibly predict them.

Another disadvantage of traditional control methods is that the processing of the measurement data occurs substantially continuously without appropriate historicization, as well as contextualization, thereof.

There is therefore a need to perfect a control method for an industrial plant which can overcome at least one of the disadvantages of the state of the art.

In particular, one purpose of the present invention is to provide a control method able to automatically combine with the measurement data also the information relating to the perception of the weak signals.

Another purpose of the present invention is to provide a control method which allows to acquire and process both the measurement data and also the information relating to the weak signals.

It is also a purpose of the present invention to provide a control method able to automate the functioning of the plant not only in normal operating conditions, but also in extraordinary operating conditions.

Another purpose is to perfect a control method in which the operator assists and is assisted by the automation system.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, a control method for an industrial plant comprises the acquisition of a plurality of measurement data relating to the components of a plant and/or a product being worked, their storage in a storage device and simultaneously their transmission to an automation system which uses the measurement data to generate respective control signals, the measurement data and at least some of the control signals being transmitted to an interactive platform.

According to one aspect, a first interactive platform comprises at least one device for assisting an operator having a control unit which, in a control step, uses suitable verification rules and continuously compares the measurement data, possibly combining them with at least some of the control signals and with control commands, given by an operator, in order to identify specific operational events characteristic of the process.

According to another aspect, each of the operational events as above defines a point of interest which is an aggregation of measurement data, operational control signals and possibly also video-audio contents relating to a determinate time window prior to and following the operational event. This aggregation of data can also comprise the detection and analysis of the behavior of the operators who supervise the ongoing process.

According to another aspect, the method provides a step of comparative analysis between homogeneous points of interest carried out at the end of the process in progress and after the control step, in which a processing unit of a second interactive platform allows to operate at least the comparison between all the points of interest generated during the process just ended and during previous processes, or to generate additional points of interest transmitting corresponding information on a screen. Such information can be, for example, but not limited to, of the augmented reality type.

According to another aspect, a time stamp is associated with each point of interest and the time window refers to a determinate period of time prior to and following the specific operational event that characterizes it.

According to another aspect, the points of interest are automatically generated by the control unit and possibly by the processing unit, or they can be manually generated by the operator on the basis of direct observations or weak signals.

According to another aspect, the points of interest are classified according to the degree of importance with fixed, dynamic or self-learned verification rules, which allow to determine a deviation of the process, either in progress or occurred, from an optimum criterion.

According to another aspect, the points of interest are classified as normal events, alarm events, malfunction events. At least in the case of points of interest classified as malfunction events, during the control step the control unit is configured to project on the main screens of the first interactive platform the images relating to the event occurring, in order to increase the level of attention from the operators. The level of attention can also be raised by combining, with the images, the corresponding sound flow in order to alert not only the sense of sight but also the sense of hearing.

According to another aspect, each point of interest contains measurement data relating to all the plant components that characterize the process and that are being monitored. The points of interest can also contain measurements relating to the quality of a determinate product, as well as the identification labels of all the raw materials used to manufacture the product, as well as measurements relating to energy consumption.

According to another aspect, the control step and the analysis step occur at different moments and in completely separate and independent environments.

According to another aspect, the analysis step can occur simultaneously with the control step in "What-if" mode, in which, starting from current plant conditions, the continuation of the process is simulated, varying determinate control parameters.

According to another aspect, the second interactive platform allows to supervise the process in progress and trace the product being worked in all the working steps thereof, including the steps of movement between the plant components.

According to another aspect, during the control step there is provided a step of entering additional information relating to the points of interest generated, in which on the screen of the operator assistance device a screen is displayed which offers the operator the option of entering the information in written or oral form.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
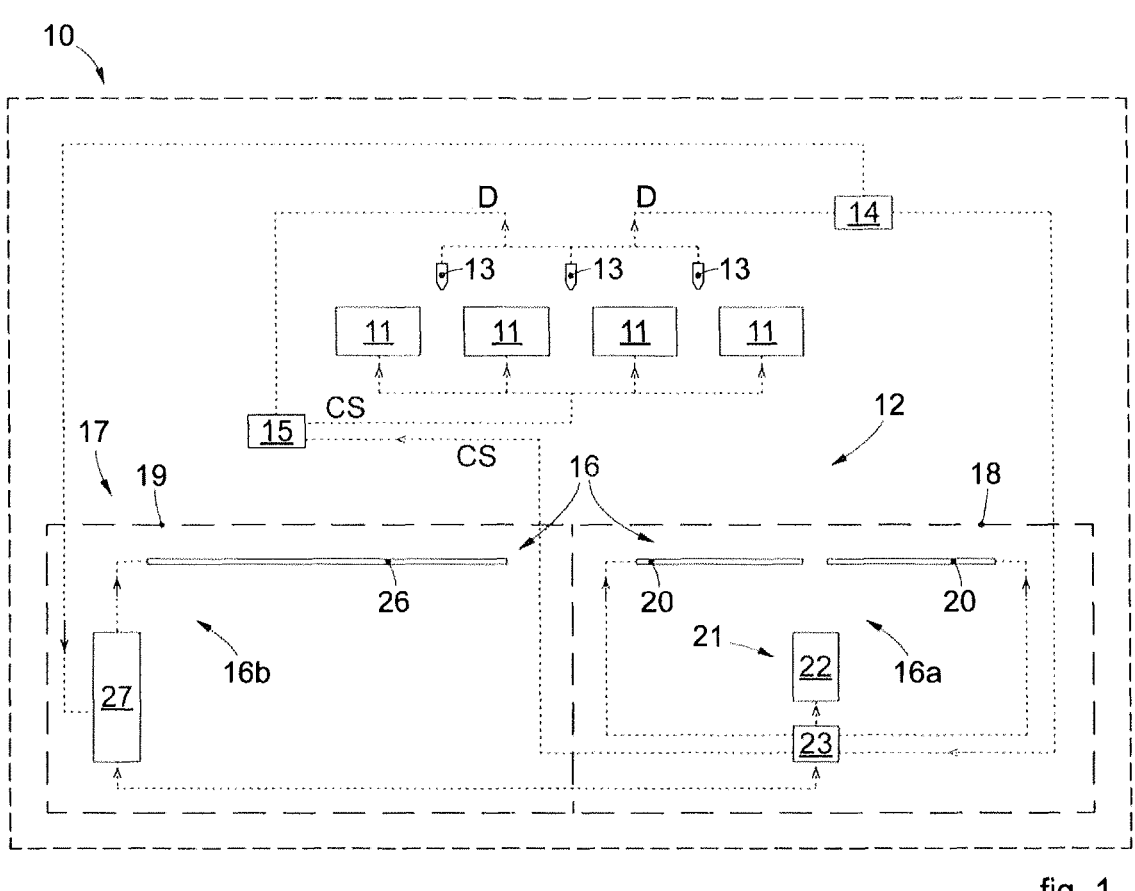
FIG. 1 is an example diagram that shows an industrial plant managed with the control method in accordance with the embodiments described here.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

The embodiments described here concern a control method for an industrial plant 10, schematically shown in FIG. 1.

The industrial plant 10 can be a plant for the food industry, metallurgical and steel industry, petrochemical industry, paper industry, pharmaceutical industry, textile industry, chemical industry and suchlike.

The industrial plants 10 in question comprise a plurality of plant components 11 and a control apparatus 12.

By plant components 11 here and hereafter we mean any apparatus, equipment, machine or device whatsoever that contributes to producing, working, or controlling a determinate product in a specific industrial plant 10.

The control apparatus 12 comprises a plurality of detection devices 13 associated with the plant components 11 and able to detect, either directly or indirectly, respective measurement data D.

The detection devices 13 are configured to detect determinate physical measurements correlated to the process and machine parameters of the plant components 11, and/or to the product being worked and possibly also to the surrounding environment.

The detection devices 13 can be real or virtual. By virtual detection device we mean a processing system that, by means of suitable algorithms, is able to supply data relating to parameters that cannot be measured directly, are difficult to measure directly, or the direct measurement of which would involve an excessively high cost.

By way of example, the detection devices 13 can be selected from a group comprising position sensors, photocells, thermocouples, pressure gauges, current sensors, voltage sensors or other.

The detection devices 13 can comprise audio-video detection devices. The image can be of the optical or infrared type.

The detection devices 13 can comprise devices to detect acoustic vibrations and corresponding spectra.

The control apparatus 12 comprises a storage device 14 in which the measurement data D is stored.

Preferably, the measurement data D is stored in raw form, that is, without undergoing processing or transformation, so as to preserve all the information contained therein.

A time stamp is associated with the measurement data D which configures the data as time series of measurement data.

The measurement data D recorded in the storage device 14 can be both of the analog type and also of the digital type, according to the type of detection devices 13 and the measurement to be performed.

The measurement data D can be homogeneous, heterogeneous, possibly made adimensional.

The storage device 14 can be a centralized system, a distributed system or a cloud type remote system.

The control apparatus 12 comprises an automation system 15 able to continuously receive the measurement data D from the detection devices 13 and to process respective operational control signals CS to be transmitted to the plant components 11. The automation system 15 comprises actuator devices associated with the plant components 11 and configured to receive the control signals CS and to determine corresponding operational actions on the plant components 11.

The control apparatus 12 comprises an interactive platform 16 that allows to control and manage the industrial plant 10, and also allows to historicize and consult all the information relating to processes and products.

The interactive platform 16 can be installed in a control cabin, hereafter also pulpit 17, inside the industrial plant 10, preferably in an elevated position, facing the process in progress.

In other embodiments, the pulpit 17 can be positioned outside the industrial plant 10, in a remote position.

The pulpit 17 can comprise two zones, or independent and separate environments, wherein each environment can be provided with its own interactive platform 16.

A first zone 18 of the pulpit 17, hereafter command room 18, can be dedicated to the reproduction and real time display of the contents acquired by means of the detection devices 13, for example the measurement data D, the functioning data of the industrial plant 10—for example the data received from the automation system 15 relating to the functioning of the plant components 11—and/or video-audio contents, or other.

A control step of the process in progress is then carried out in the command room 18.

A second zone 19 of the pulpit 17, hereafter analysis room 19, can be dedicated to the reproduction, for example "delayed" or simultaneous, of the contents that have been recorded in the storage device 14 and of the contents identified and processed in the command room 18, for example in order to carry out consultations or verifications of the processes that have already occurred or are occurring.

An analysis step of the processes that have already occurred, or a consultation of the events of the process in progress, is then carried out in the analysis room 19.

Figures 3, 4, 5:
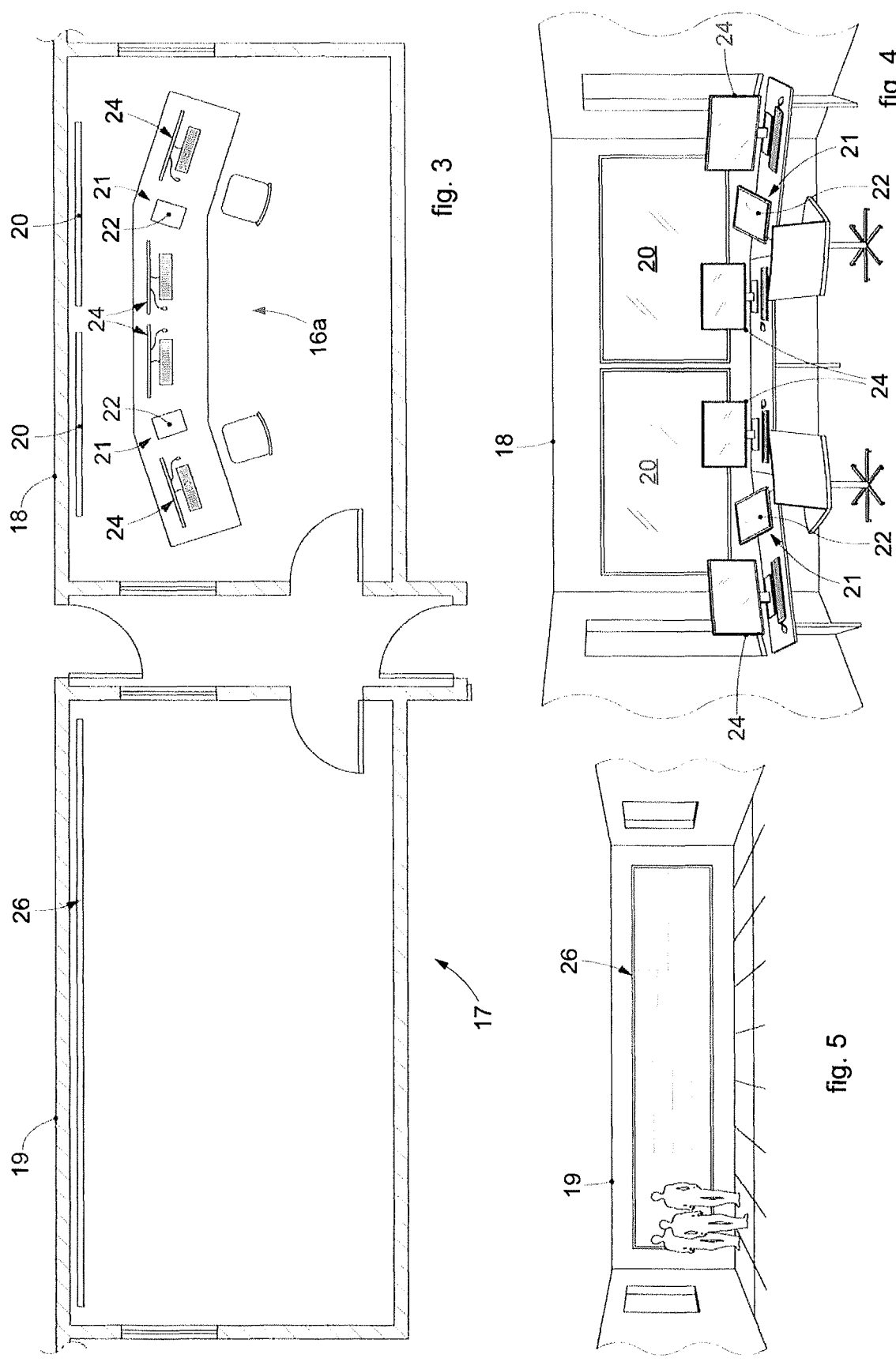
FIG. 3 is a top plan view of the control pulpit of the industrial plant in which a control room and an analysis room are visible, where respectively the control step and the analysis step are carried out.
FIG. 4 is a three-dimensional view of the control room of FIG. 3.
FIG. 5 is a three-dimensional view of the analysis room of FIG. 3.

As shown in FIG. 3, the command room 18 and the analysis room 19 can be two rooms, or completely independent environments. The analysis room 19 can possibly be disposed in a remote position with respect to the installation site of the industrial plant 10, and can receive and process machine and process data of more than one industrial plant 10 at a time, also allowing an immediate cross-comparison of the data.

With reference to FIGS. 3-4, the command room 18 is used to control and manage the industrial plant 10 and the processes in progress. The command room 18 has a first interactive platform 16a and command stations, preferably two, in which respective operators take their places who can share the same functions and responsibilities, or deal with different operational functions.

The first interactive platform 16a comprises at least one main screen 20, preferably large, even up to 98 inches and more, disposed in front of each of the stations as above.

An additional main screen shared by both operators can be positioned between two main screens 20, in order to project and analyze shared scenarios or scenarios that require special attention.

The main screens 20 can allow to display the process in progress in real-time, for example thanks to closed-circuit cameras disposed in focal points of the industrial plant 10.

The main screens 20 can have a dedicated display zone where the parameters of the process in progress, correlated to the images projected or relating to determinate zones of the industrial plant 10, are visible.

The main screens 20 can allow to simultaneously display several zones of the industrial plant 10.

The first interactive platform 16a can comprise additional monitors 24 and one or more interaction devices with commands such as real or virtual keyboards, joysticks, keys, levers or other.

The first interactive platform 16a comprises at least one operator assistance device 21 associated with at least one of the two stations, preferably with both. The operator assistance device 21 is configured both to allow the operator to enter commands toward the automated devices and also to supervise the process in progress, as better explained below.

The operator assistance device 21 comprises a control unit 23, configured to process and classify in real time a plurality of events of the process in progress, in chronological order of occurrence, and a screen 22, for example of the touchscreen type, on which the events as above are displayed.

The control unit 23 comprises a central processing unit, or CPU, and at least one storage unit connected to it, which can also be the same storage device 14, and in which at least one processing algorithm is stored which is capable of causing the same CPU, in response at least to the measurement data D and to the corresponding operational control signals CS, to generate command signals to be transmitted to the automation system 15 which in turn processes them into corresponding control signals CS to be sent to the plant components 11. The control unit 23 is operatively associated with the interactive platform 16a, in particular at least with the automation system 15, with the screen 22 and with the main screens 20.

In the event that there are two or more operator assistance devices 21, there can be a single control unit 23 which is operationally shared.

The control unit 23 is configured to receive, from the automation system 15 or from the storage device 14, at least the measurement data D relating to the detection devices 13 and the data relating to the operational control signals CS of the plant components 11.

The control unit 23 is configured to allow to generate a plurality of points of interest POI, that is, to define particular aggregations of measurement data D, operational control signals CS and possibly also video-audio contents relating to a determinate time window on the basis of specific verification rules R.

The verification rules R are highly dependent on the type of event being monitored.

Each point of interest POI is detected on the basis of a specific event that characterizes the process in progress; it can also contain measurement data D relating to all the plant components 11 that characterize the process, or only some of them, and also other data relating to tracing, quality, the operators involved and more.

The measurement data referring to a point of interest POI can be homogeneous, heterogeneous, possibly made adimensional.

The point of interest POI can also contain measurements relating to the quality of a determinate product, as well as the identification labels of all the raw materials used to manufacture the determinate product.

More or less complex statistical analyzes can be applied to the numeric measurement data, for example average, minimum or maximum values, standard deviation or other. Any missing measurement data can be replaced, for example, with an average value or with other choices based on known statistical methods.

A time stamp is associated with each point of interest POI and the time window therefore refers to a determinate period of time prior to and following a specific event that characterizes the point of interest POI.

The points of interest POI can be classified according to the degree of importance. The classification can be performed on the basis of the verification rules R as above, and possibly on the basis of fixed or dynamic thresholds, or self-learned thresholds, which allow to determine a deviation of the process in progress from an optimum criterion. The points of interest POI can be classified by means of the processing algorithms as above, for example by means of a special classification algorithm.

The points of interest POI can be classified as normal events, alarm events and malfunction events. Possible additional classifications or sub-classifications are however possible.

According to possible embodiments, the determination that a point of interest POI is approaching can be achieved by means of a processing algorithm that performs the analysis of the first derivatives in time of a determinate physical measurement. The control unit 23 is able to identify possible instabilities and warn the operators by means of the operator assistance device 21.

At least in the case of alarm and malfunction points of interest POI, the control unit 23 is configured to project on the main screens 20 the images relating to the event occurring in order to increase the level of attention from the operators.

The control system 23 can, by means of the processing algorithms as above, automatically modify the images projected on the screens 20, for example in order to focus the attention of the operators on the plant components 11, possibly in an enlarged image, located in the zone of the industrial plant 10 where the point of interest POI is occurring.

The points of interest POI can be automatically generated by the control unit 23, following the processing generated by the processing algorithms as above or, for example, on the basis of heuristic rules.

The points of interest POI can be manually generated by the operator by means of the operator assistance device 21, on the basis of direct observations or so-called weak signals.

The manual points of interest POI represent warnings of notable behaviors or phenomena observed by operators.

At each manual point of interest POI, the operator has the possibility to combine additional qualitative information.

This additional information can be supplied to the control unit 23 in a known manner.

According to one embodiment, there is provided a step of entering the information, in which on the screen 22 of the operator assistance device 21 a screen is displayed which offers the operator the option of entering information. The operator can approve and subsequently enter such information in written or oral form.

The additional information can be written or verbal in nature, and can be transcribed by an automatic interpreter.

The additional information can be coded with an appropriate language in order to be univocally traced back to the specific point of interest POI. The additional information, if encoded with a pair of specific words, can be transformed into dichotomous or binary variables.

The control and verification of the manual points of interest POI are carried out post hoc with respect to the moment in which they are generated by qualified personnel who, within a predefined time interval, judge whether these are events to be taken into consideration, and therefore classified and historicized, or not. Once the predefined time interval has passed, in the absence of confirmation, the manual point of interest POI and the data associated with it will be deleted.

Figure 2:
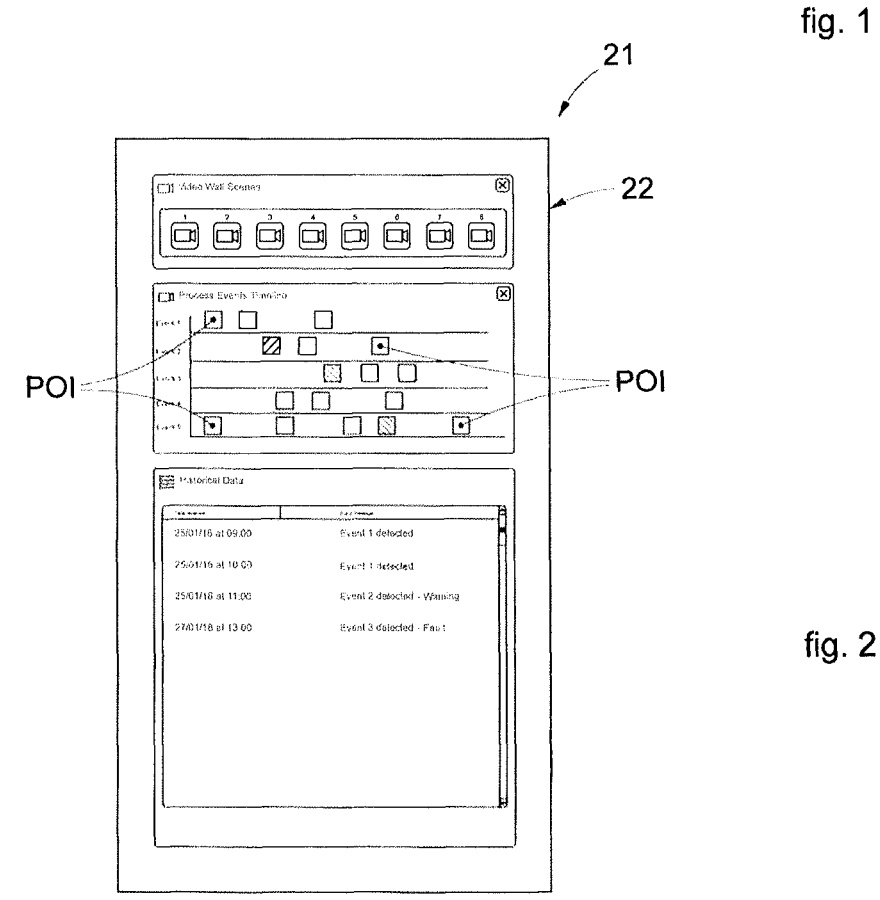
FIG. 2 is a screen displaying the points of interest on the screen of the operator assistance device.

With particular reference to FIG. 2, the points of interest POI can be displayed on the screen 22 of the operator assistance device 21, or on the main screens 20 in augmented reality, in graphs with markers of different color and shape, or they can be listed.

The points of interest POI are displayed on the operator assistance device 21 in chronological order with a color code that matches a normal event with the color blue, an alarm event with the color yellow and a malfunction event with the color red.

The operator assistance device 21 allows a navigation mode between the points of interest POI generated. For example, by selecting a specific point of interest POI, it is possible to access all the information that characterizes it.

It is also possible to select all the points of interest POI relating to similar events. For example, a possible sub-classification can group together events of a specific plant component 11.

It is also possible to select all the points of interest POI that have the same classification.

In both cases—selection of similar events or of events with the same classification of interest—thanks to the processing algorithms as above, a performance comparison is performed, favorably under the same operating conditions, in order to choose the best sequence of control signals CS as the manager varies, such sequence being used, together with other operational parameters, as a training database to train a neural network, or as a guideline to support a less experienced operator.

The control unit 23 is also configured to store in its own memory unit and to associate the actions performed by the operators, for example executed by means of the console buttons, and/or the operational control signals generated automatically by the automation system 15. This information is combined with the points of interest POI generated, both automatically and manually, in such a way as to identify any human and/or automatic control errors, or simply to identify which one of the actions performed is the best one, that is, the one closer to an optimum criterion.

The optimum criterion can be oriented to the management or yield, either quantitative or qualitative, or to the maintenance of the industrial plant 10, or to the geometric result of the final product, or to the energy consumption of the industrial plant 10 or other possible criteria.

In this sense, it is possible to provide to use the processing algorithms as above, in particular optimization algorithms, which by applying verification rules R, which differ according to the type of optimum criterion to be pursued, process the information contained in the POIs in order to return indications of an optimum or directly optimal operational control signals CS. The points of interest POI can therefore be used by the processing algorithms to also return indications of an optimum, or of a best practice, and not only to identify unwanted situations.

For example, a determinate point of interest POI can identify a univocal situation in which a particular qualitative outcome (particular proximity to the objectives) has been achieved or, on the contrary, a situation in which a poor level of quality has been achieved (out of chemical or geometric tolerance, or other).

The generation of the points of interest POI allows to facilitate the extraction of significant data for the development of possible predictive models of any significant or anomalous event, in order to be able to predict future similar events before they occur.

The data relating to a determinate point of interest POI do not refer only to the plant components 11 that have manifested a particular event, but rather comprise all the data relating to the plant components 11, favorably of the entire supply chain, from the raw materials area to the finished products area.

In fact, any given event can have a local cause, or evidence, or it can be caused by actions or conditions that have occurred even in a very distant and/or delocalized time.

The operator assistance device 21 can allow to select a determinate optimum criterion and subsequently the events connected to the points of interest POI relating to the optimum criterion to be pursued are processed by means of the optimization algorithms as above.

The control unit 23 is configured to automatically process the information relating to the points of interest POI and it can, by means of the screen 22, the main screens 20, possibly also with voice synthesis, suggest possible optimal sequences of commands in order to prevent reaching an unwanted event that is about to occur, or to remedy a problem that has already occurred as quickly and effectively as possible.

Optionally, the suggestion of the optimal sequence can be sent as command signals directly to the automation system 15, while operators may be required to simply check and confirm to proceed.

The sequences of commands executed by the operators can also be subject to statistics in order to determine any corrective behavior to be implemented.

According to some embodiments, the analysis room 19 is used to analyze the processes of the industrial plant 10 which occurred in the past, for example over a period of time up to three previous days or more.

The analysis room 19 can accommodate a certain number of people and can also be used for staff training, or for a post hoc analysis of events that occurred during a work shift.

With reference to FIG. 1, FIG. 3 and FIG. 5, the analysis room 19 comprises a second interactive platform 16b comprising at least one large interactive screen 26 and a processing unit 27 operatively connected to the screen 26, to the control unit 23 of the operator assistance device 21 and to the storage device 14.

The processing unit 27 is configured to transmit on the screen 26 the data and images relating to a specific process selected.

The processing unit 27 can be integrated in the screen 26, or it can be an independent component.

The images can be augmented reality images, that is, additional information can be combined with the real images, or with sequences of images, using the measurement data D stored in the storage device 14.

The processing unit 27 can be configured to compare the points of interest POI already recorded by the control unit 23.

While the images are displayed on the interactive screen 26, it is possible to indicate possible additional points of interest POI or delete those already indicated that do not present real evidence.

According to possible embodiments, the points of interest POI can be generated even if no significant or anomalous event has occurred during the process in progress, and they can be evaluated with respect to previously recorded data (playback mode).

In case of failure to generate a point of interest POI following a significant or anomalous event that actually occurred during the process, it is possible to carry out an automatic training of the processing algorithms, in particular of anomaly detection algorithms, using the previously recorded data. For example, in the event that an anomalous event occurs, but an alarm point of interest POI is not generated, it is possible to use the historicized records relating to anomalous events of the same type in order to re-train a predictive model and re-verify it on all past anomalous events.

The processing unit 27 allows to access the data saved by the different information sources with selection criteria that may not necessarily be the time period. These selection criteria can be, for example, the production order, the order, the customer name, the material that the product consist of, the range, the physical state, the non-conformity or production anomaly, the energy consumption, or other criteria.

According to possible embodiments, the analysis room 19 can also act as a simulation environment. For example, starting from a specific process in progress, it is possible to change the process variables in order to predict/prevent possible events that have occurred in reality. In this case, we speak of "What-if" analysis modes.

EXAMPLE 1

The industrial plant can be a strip rolling plant comprising a heating furnace for metal products, for example slabs, a rolling train provided with a plurality of rolling stands located in sequence and through which a product being rolled passes in a rolling direction, and a winding reel disposed at the end of the rolling train and able to wind the rolled product into reels.

The rolling plant is provided with a plurality of sensors disposed along the line and with a video monitoring system that comprises a plurality of video cameras that monitor a series of focal points.

For example, it is possible to provide a video camera that focuses on the entry and/or exit of the heating furnace, a video camera located upstream and downstream of each rolling stand, as well as at least one video camera positioned at the end of the rolling train to monitor the winding of the strip, and even video cameras located in the raw materials warehouse, in the finished products area and in the shipping area.

For example, the video cameras placed to control the rolling stands can be configured to detect any skidding of the product being rolled.

The data relating to the control of the product being rolled are transmitted to the storage device 14 and then, either in the raw state or once processed, to the control unit 23 which generates, or doesn't generate, a point of interest POI in the event that, based on the verification rules R at that moment, a skidding of the product being rolled is occurring.

The point of interest POI is then displayed by the operator on the touch screen 22 of the operator assistance device 21. At the same time, the control unit 23 can transmit suitable corrective signals directly to the automation system 15, or to the operator, or to both.

The point of interest POI generated on the basis of the skidding event of the product being rolled can contain information relating to all the steps preceding this event. In this way, it is possible to univocally identify the cause of the skidding which can be related to errors upstream, even ones very distant in time, for example errors during the billet casting process, or errors in the choice and composition of the set of raw materials sent to the melting furnace, or even errors in process temperatures or other.

EXAMPLE 2

In the context of application to the primary or secondary metallurgy of a steel plant, the points of interest POI and their processing can be used to identify the correction parameters of the model for chemical additivation/correction of the steel in the ladle or in the electric arc furnace. In particular, by inserting a point of interest POI that contains the information relating to the parameters actually used in the additivation operation, it is possible to compare this information with the results obtained from the physical-mathematical model and train a neural network that allows to identify the correction parameters of the physical-mathematical model in order to improve its performance as the operating conditions and yields of the materials vary.

EXAMPLE 3

In the context of application to an electric arc furnace, the points of interest POI and their processing can be used to identify the chemical composition of the scrap entering the melting process in relation to changes in the characteristics, by using a point of interest POI that identifies the instant of recovery of the chemical sample after the slagging operation and uses it to perform a first comparison between presumed analysis and real analysis.

EXAMPLE 4

In the context of application to a continuous casting line, a point of interest POI and its processing can be used to identify a range of the measurement data of the cutting of a billet or bloom, when the weight parameters within which a billet/bloom being cut are violated, in order to train a neural network that feeds a corrective model of the cutting setup of the Torch/Shear.

EXAMPLE 5

In the context of application to a rolling line, a point of interest POI and its processing can be used to classify defects during the qualitative analysis of a rolled strip in order to train a machine learning model to predict such defects on the basis of the useful data recorded.

It is clear that modifications and/or additions of steps may be made to the control method as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. A control method for an industrial plant (10) comprising:

acquiring a plurality of measurement data (D) relating to components (11) of a plant and/or to a product being worked;

storing the plurality of measurement data in a storage device (14); and transmitting the plurality of measurement data to an automation system (15) which uses said measurement data (D) to generate respective control signals (CS), said measurement data (D) and said control signals (CS) being transmitted to an interactive platform (16; 16*a*, 16*b*), wherein a first interactive platform (16*a*) comprises at least one device (21) for assisting an operator, having a control unit (23) which, in a control step, uses suitable verification rules (R) and continuously compares said measurement data (D), combining said measurement data (D) with said control signals (CS) and with control commands, given by an operator, in order to identify specific operational events characteristic of a process, wherein each of said operational events defines a point of interest (POI) which is an aggregation of measurement data (D), operational control signals (CS) and also video-audio contents relating to a determinate time window prior to and following said event on the basis of said verification rules (R), and wherein said points of interest (POI) are generated automatically by said control unit (23), wherein said control unit (23) is configured to automatically process information relating to said points of interest (POI) and to suggest optimal sequences of commands in order to prevent reaching an unwanted event that is about to occur, or to remedy a problem that has already occurred.

2. The method as in claim 1, further comprising an analysis step carried out at the end of said process after said control step, in which a processing unit (27) of a second interactive platform (16*b*) allows to operate at least a comparison between all points of interest (POI) generated in said process and during previous processes, to generate additional points of interest (POI) and/or to validate or eliminate the points of interest (POI) previously generated in said control step, transmitting corresponding information on a screen (26).

3. The method as in claim 2, wherein a time stamp is associated with each point of interest (POI) and the time window refers to a determinate period of time prior to and following a specific event that characterizes said point of interest (POI).

4. The method as in claim 2, wherein said additional points of interest (POI) are generated automatically by said processing unit (27).

5. The method as in claim 2, wherein said control step and said analysis step occur at different moments and in completely separate and independent environments.

6. The method as in claim 1, wherein said points of interest (POI) are classified according to a degree of importance with fixed, dynamic or self-learned verification rules (R), which allow to determine a deviation of the process, either in progress or occurred, from an optimum criterion.

7. The method as in claim 6, wherein said optimum criterion is directed to the management or quantitative or qualitative yield, or to the maintenance of the industrial plant (10), or to the geometric result of a final product or to the energy consumption of the industrial plant (10).

8. The method as in claim 6, wherein said points of interest (POI) are classified as normal events, alarm events, malfunction events, wherein at least in the case of points of interest (POI) classified as malfunction events, during the control step said control unit (23) is configured at least to project on main screens (20) of said first interactive platform (16a) the images relating to the event occurring in order to increase the level of attention from operators.

9. The method as in claim 1, wherein during the control step, said points of interest (POI) are displayed on a screen (22) of an operator assistance device (21) in graph form, with markers of different color and/or shape, and/or as a listing, in chronological order.

10. The method as in claim 9, wherein during said control step there is provided a step of entering additional information relating to the points of interest (POI) generated, in which on said screen (22) of said operator assistance device (21) a screen is displayed which offers the operator an option of entering said information in written or oral form.

11. The method as in claim 1, wherein each point of interest (POI) contains measurement data (D) relating to the components (11) of the plant that characterize the process, and which are monitored directly or indirectly.

12. The method as in claim 1, wherein said points of interest (POI) also contain measurements relating to the quality of a determinate product, as well as identification labels of all the raw materials used to manufacture said product.

13. The method as in claim 1, wherein it comprises an analysis step which occurs simultaneously with said control step in "What-if" mode, in which, starting from current plant conditions, the continuation of the process is simulated, varying determinate control parameters.

14. The method as in claim 1, wherein said second interactive platform (16b) allows to supervise the process in progress and trace a product being worked in all the working steps thereof, including steps of movement between the plant components (11).

* * * * *